United States Patent
Hensiek et al.

(10) Patent No.: US 10,323,420 B2
(45) Date of Patent: Jun. 18, 2019

(54) FACADE FOR A BUILDING, CONSTRUCTED FROM COMPOSITE ELEMENTS

(71) Applicant: BASF SE, Ludwigshafen am Rhein (DE)

(72) Inventors: Rainer Hensiek, Melle (DE); Michael Thater, Goldenstedt (DE); Kay Michael Brockmueller, Neustadt (DE); Andreas Wuest, Zwingenberg (DE); Torsten Hensel, Bensheim (DE); Roland Fabisiak, Brockum (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/747,158

(22) PCT Filed: Jul. 20, 2016

(86) PCT No.: PCT/EP2016/067240
§ 371 (c)(1),
(2) Date: Jan. 24, 2018

(87) PCT Pub. No.: WO2017/016944
PCT Pub. Date: Feb. 2, 2017

(65) Prior Publication Data
US 2018/0216352 A1    Aug. 2, 2018

(30) Foreign Application Priority Data

Jul. 24, 2015   (EP) .................................. 15178366

(51) Int. Cl.
*E04F 13/08*    (2006.01)
*E04F 13/12*    (2006.01)
(Continued)

(52) U.S. Cl.
CPC ........ *E04F 13/0878* (2013.01); *E04F 13/086* (2013.01); *E04F 13/0846* (2013.01);
(Continued)

(58) Field of Classification Search
CPC .............. E04F 13/0878; E04F 13/0866; E04F 13/0846; E04F 13/12; E04F 13/0894;
(Continued)

(56) References Cited

U.S. PATENT DOCUMENTS 2,728,423 A * 12/1955 Brown ..................... E04C 2/292
52/506.05
3,001,613 A * 9/1961 McBerty ............... E04B 1/6158
52/580

(Continued)

FOREIGN PATENT DOCUMENTS

DE       2449917 A1 *  4/1976   ............... E04B 1/54
DE       3834612 A      4/1990
(Continued)

OTHER PUBLICATIONS

Translation of Description of DE 2449917 Publication Date: Apr. 1976.*
(Continued)

*Primary Examiner* — Jeanette E Chapman
(74) *Attorney, Agent, or Firm* — Armstrong Teasdale LLP

(57) ABSTRACT

Provided herein is a facade for a building, made up of composite elements, the composite elements respectively having an inner cover layer, a polymer foam layer as the core and an outer metallic cover layer, and are fastened to a supporting structure. Each composite element has at least two fastening regions, in one fastening region the composite elements are immovably connected to the supporting structure and in the other fastening regions the composite elements are displaceably connected to the supporting struc-
(Continued)

ture, or the composite elements resting with the ground-facing side on a mounting and all fastening regions displaceably connected to the supporting structure.

16 Claims, 3 Drawing Sheets

(51) Int. Cl.
  *B32B 5/18* (2006.01)
  *B32B 15/04* (2006.01)
  *B32B 15/08* (2006.01)

(52) U.S. Cl.
  CPC ...... *E04F 13/0866* (2013.01); *E04F 13/0875* (2013.01); *E04F 13/0894* (2013.01); *E04F 13/12* (2013.01); *B32B 5/18* (2013.01); *B32B 15/046* (2013.01); *B32B 15/08* (2013.01); *B32B 2305/022* (2013.01); *B32B 2307/304* (2013.01); *B32B 2419/00* (2013.01); *E04F 2201/0107* (2013.01); *E04F 2201/023* (2013.01); *E04F 2201/043* (2013.01)

(58) Field of Classification Search
  CPC .............. E04F 13/086; E04F 2201/043; E04F 2201/0107; B32B 2305/022; B32B 2419/00; B32B 5/18; B32B 15/046; B32B 15/08; B32B 2307/304
  See application file for complete search history.

(56) References Cited

U.S. PATENT DOCUMENTS

| | | | | |
|---|---|---|---|---|
| 3,621,635 | A * | 11/1971 | De Lange | E04F 13/083 29/460 |
| 3,793,789 | A * | 2/1974 | Greenamyer | E04B 1/0007 52/463 |
| 4,236,366 | A * | 12/1980 | Rijnders | E04B 1/6133 52/580 |
| 4,304,083 | A * | 12/1981 | Anderson | E04F 13/0878 52/309.9 |
| 7,748,181 | B1 * | 7/2010 | Guinn | E04F 13/0878 52/235 |
| 8,347,577 | B2 * | 1/2013 | Aboukhalil | E04F 13/0733 52/211 |
| 8,631,620 | B2 * | 1/2014 | Guinn | E04B 1/4178 52/309.11 |
| 8,839,582 | B2 * | 9/2014 | Aboukhalil | E04F 19/022 52/460 |
| 9,506,252 | B2 * | 11/2016 | Molteni | A47F 5/0846 |
| 2012/0073224 | A1 * | 3/2012 | Carolan | E04C 2/292 52/309.4 |
| 2012/0304573 | A1 * | 12/2012 | Aboukhalil | E04F 13/0816 52/506.05 |
| 2013/0227902 | A1 * | 9/2013 | Van Sloun | E04C 2/296 52/309.4 |
| 2013/0269276 | A1 * | 10/2013 | Gaynor | E04F 13/083 52/506.05 |
| 2015/0107175 | A1 * | 4/2015 | Frazier | B05D 3/12 52/309.1 |

FOREIGN PATENT DOCUMENTS

| | | | |
|---|---|---|---|
| DE | 10028750 A1 | 12/2001 | |
| GB | 2297824 A * | 8/1996 | ............ E04D 3/352 |
| WO | 2009077490 A2 | 6/2009 | |
| WO | 2010060864 A2 | 6/2010 | |
| WO | 2012093129 A1 | 7/2012 | |

OTHER PUBLICATIONS

International Preliminary Report on Patentability for International Application No. PCT/EP2016/067240, English Translation, dated Jan. 25, 2018, 8 pages.
International Search Report for International Application No. PCT/EP2016/067240, dated Aug. 17, 2016, 2 pages.
Jörg Lange, René Mertens, Sandwich am Bau, Thema Forschung Jan. 2006, pp. 30 to 34.

* cited by examiner

FACADE FOR A BUILDING, CONSTRUCTED FROM COMPOSITE ELEMENTS

CROSS-REFERENCE TO RELATED APPLICATIONS

This application is the national stage entry of PCT/EP2016/067240, filed on Jul. 20, 2016, which claims the benefit of priority to European Patent Application No. 15178366.9, filed Jul. 24, 2015, which is incorporated by reference in its entirety herein.

FIELD OF THE INVENTION

The invention relates to a facade for a building, made up of composite elements, wherein the composite elements respectively have an inner cover layer, a polymer foam layer and an outer metallic layer and are fastened to a supporting structure.

BACKGROUND

Composite elements which are made up of two outer metallic layers and an intermediate layer of a polymer foam are increasingly being used as facade elements for buildings, in particular in the commercial sector, such as warehouses or industrial buildings, for instance workshops, sports halls, department stores or assembly shops. The composite elements used in facade construction are often also referred to as sandwich elements or sandwich panels.

The use of composite elements allows a rapid construction of the respective building, since only one supporting structure of metal, concrete or wood, to which the composite elements are subsequently attached, has to be built. A further advantage of composite elements is their good thermal insulation, which derives from the structure comprising the inner core of polymer foam.

Various methods which can be used to produce composite elements usable as facade elements are known, for instance, from WO-A 2009/077490, WO-A 2010/060864 or WO-A 2012/093129. In these, a fundamental point is in each case the good adhesion of the layer of polymer foam to the respective cover layers of metal in order to prevent the metallic cover layers from becoming detached from the polymer foam core, thereby resulting in undesirable damage to the composite elements.

A further fundamental aspect is the fastening of the composite elements to the supporting structure. This fastening of the composite elements is generally effected by a screw connection. Thus in "Bauen mit Stahl, Stahlbau Arbeitshilfe No. 46, Sandwichelemente", different variants for the assembly of composite elements used as wall elements or roof elements are described. In this case, in particular a screw connection variant in which the screws used for the fastening are not visible from the outside has won approval. The composite elements are here equipped with tongue and groove and in the region of the tongue the composite elements are screwed to the supporting structure. The next composite element is slid with the groove over the tongue and the screws are hereby concealed. The positions and the nature of the screw connection are generally specified and described in the technical documentation of the manufacturer of the composite elements. In contrast hereto, the composite elements of cold stores are generally screwed visibly along the individual beams of the supporting structure.

In the case of screw connections of the composite elements, in particular of the kind used for the construction of cold stores, a failure of the composite elements through formation of a kink in the outer metallic cover layer has been observed. This kink is attributable to different thermal expansions, in particular during solar radiation onto the outer side of the cold store, since the composite elements on the outer side can heat up strongly under solar radiation. On the other side, temperatures within the range from −35 to −20° C. usually prevail in the interior, so that, across the composite elements, a temperature difference of up to 80° C. can arise. The outer cover layer expands very much more strongly, which in the worst case results in total failure as a result of buckling of the metallic outer cover layer. The corresponding mechanisms have been described, for example, by Jörg Lange, Renē Mertens, Sandwich am Bau, Thema FORSCHUNG 1/2006, pages 30 to 34.

In order to counter the kinking due to large temperature differences on the inner side and outer side of the composite elements, for the construction of low-temperature stores in silo construction it has been proposed in DE-A 38 34 612 to use clamps to fasten the composite elements to the supporting structure, which clamps enable displacement. Clamps for fastening natural stone slabs for facings are known from DE-A 100 28 750. However, this type of fastening is used exclusively for low-temperature stores or cold stores, while an application for other buildings is not known.

In contrast to the known formation of a kink in the outer metallic cover layer of the composite element, it has now been shown that, in screwed composite elements having dark outer surfaces, an irreversible, wavy deformation can arise. This deformation can in particular be observed when the facade elements have been mounted at low temperatures and have a plane or almost plane surface. Moreover, this phenomenon also occurs in particular in composite elements which have a length of at least 3 m. As a result of the wavy deformation of the outer surface, the core of polymer foam can locally tear and, as a result of reversible cooling and heating, sizeable blisters are formed. The heating here occurs, for example, through solar radiation, and at night, or when there is no solar radiation, for example on cloudy days, the surface cools down again.

BRIEF DESCRIPTION OF THE DISCLOSURE

The object of the present invention is therefore to provide a facade for a building, which facade is made up of composite elements, wherein the composite elements respectively have an inner cover layer, a polymer foam layer and an outer metallic layer and are fastened to a supporting structure, and in which no wavy deformations arise even under the above-stated conditions.

This object is achieved by a facade for a building, made up of composite elements, wherein the composite elements respectively have an inner cover layer, a polymer foam layer as the core and an outer metallic cover layer and are fastened to a supporting structure, and wherein each composite element has at least two fastening regions, in one fastening region the composite elements being immovably connected to the supporting structure and in the other fastening regions the composite elements being connected to the supporting structure such that they are displaceable parallel to the longitudinal direction of the composite elements, or wherein the composite elements rest with the ground-facing side on a mounting and in all fastening regions are displaceably connected to the supporting structure.

It has surprisingly been shown that in an assembly in which the composite element in one fastening region is immovably connected to the supporting structure and in the other fastening regions displaceably, or in which the composite element rests on a mounting and in all fastening regions is displaceably connected to the supporting structure, the occurrence of the wavy deformations can be markedly reduced and generally no wavy deformations can be observed. In this case, it is in particular advantageous if the displacement is possible in a direction parallel to the outer cover layer of the composite element.

The composite elements are usually attached to a lattice structure as the supporting structure. This generally has beams which run transversely to the direction of assembly of the composite elements and to which the composite elements can be fastened. As the beams, wooden beams or metal beams, in particular iron beams or steel beams, can be used, for example. In the case of iron beams or steel beams, T-beams or double-T-beams are usually used.

In general, the fastening to a beam constitutes a fastening region. In the case of closely adjacent beams, in particular, there is also the possibility, however, that the fastening to the closely adjacent beams forms a fastening region. In this case, a region which is less than 10%, preferably less than 5%, of the total length of the composite element is usually denoted as a fastening region.

The distance between two fastening regions amounts to more than 10% and maximally 100% of the total length of the composite element. Preferably, the distance between two fastening regions amounts to between 15 and 50% of the total length of the composite element and, in particular, between 20 and 50% of the total length. The distance between two fastening regions is here also dependent on the total length of the composite element. The distance between two fastening regions is here the distance between the closest together fastening elements of the two adjacent fastening regions.

The fastening region in which the composite element is immovably connected to the supporting structure can be any fastening region of the composite element. Thus the fastening region in which the composite element is immovably connected to the supporting structure can be at one end of the longitudinal side of the composite element or perhaps centrally at any position on the longitudinal side. The immovable fastening can here be realized, for example, by a screwing, a riveting, a bonding or a welding. A screw connection in which the screw is screwed through the composite element and fastened to the beam of the supporting structure is preferred and customary. In this case, it is possible to realize the immovable fastening with one, or preferably also with a plurality of screws, for example two, three or four screws. The use of more than four screws is also possible. The number of screws used is here dependent on the mass of the composite element and the size of the composite element, as well as on the distance apart of the individual fastening regions. If more than one screw is used for the immovable connection, the screws can be positioned at any distance apart within the fastening region.

According to the invention, all fastening regions lie in a line, in particular at a position at which the fastening elements with which the composite element is fastened to the supporting structure can be concealed by an overhang on the adjacent composite element. It is also possible, however, to additionally provide fastenings distributed over the width of the composite element, or perhaps fastening regions which lie alternately on one side and on the other side of the composite element. Furthermore, a plurality of, for instance two or three, fastening elements can also respectively be provided on a line transversely to the longitudinal direction of the composite element. It is particularly preferred, however, if all fastening regions lie on a line parallel to the longitudinal direction of the composite element.

If the composite element rests on a mounting, any mounting can be used. Thus it is also possible, for example, to provide a projection on the supporting structure or to fasten an angle bracket or a protruding screw to the supporting structure on which the composite element rests. Alternatively, it is also possible to have the composite rest, for example, on a wall, a brick or a floor, in which case the wall, the brick or the ground act as a mounting. Of course, any other mounting on which the composite element can rest is also conceivable.

Composite elements within the scope of the present invention are made up of an outer metallic cover layer, a core of a polymer foam, and an inner cover layer. As the outer metallic cover layer is here denoted the metallic cover layer which, following assembly on the supporting structure, points outward, and as the inner cover layer the cover layer which, following assembly, points in the direction of the building interior.

According to the invention, the outer cover layer is made up of a metal, whereas the inner cover layer can be made up of a metal, plastic, wood or a cover board. Preferably, however, the inner cover layer is also produced from a metal.

As the metals for the outer cover layer and—if produced from metal—for the inner cover layer, aluminum, steel, special steel or copper are usually used. The use of steel is particularly preferred. The metal of the metallic cover layer can be coated or uncoated. Moreover, the metals of the metallic cover layer can be pretreated, for example with corona treatment, plasma treatment, flame impingement or other standard methods. In this case it is possible to use different materials for the inner and for the outer cover layer. Preferably, however, the same material is used for the inner and the outer cover layer.

The outer cover layer and, if the inner cover layer is produced from metal, also the inner cover layer, usually have a thickness within the range from 0.25 to 1.5 mm. If steel is used as the material for the cover layer, this preferably has a thickness within the range from 0.25 to 0.88 mm, and particularly preferably within the range from 0.4 to 0.75 mm. A cover layer of special steel preferably has a thickness within the range from 0.3 to 0.9 mm, and particularly preferably within the range from 0.4 to 0.6 mm. The thickness of a cover layer of aluminum is preferably 0.3 to 1.5 mm, and particularly preferably 0.5 to 0.8 mm, and the thickness of a cover layer of copper is preferably 0.3 to 1 mm, and particularly preferably 0.4 to 0.7 mm. The surface of the metallic cover layer can here have any structure, though preferably the surface is plane or has only a light structure, a so-called microprofilation. This means that the elevations or depressions in the surface, which are present as a result of the structure, are preferably no deeper than 2 mm, preferably no deeper than 1 mm.

Composite elements which are used for the facade according to the invention can have any lengths and widths which are customary for such composite elements. In general, the composite elements have a length from 2.5 to 30 m, preferably within the range from 3 to 24 m, and in particular within the range from 5 to 20 m. The width of the composite element here lies within the range from 0.5 to 1.25 m, preferably within the range from 0.9 to 1.2 m.

The thickness of the composite element lies preferably within the range from 50 to 150 mm, and preferably within the range from 60 to 140 mm.

The core of polymer foam is usually made up of a rigid foam on an isocyanate base, for instance a polyurethane foam or a polyisocyanurate foam. Additionally suitable as a polymer foam for the core is foamed polystyrene. Suitable polyurethanes and polyisocyanurates are described, for example, in WO-A 2010/060864.

The displaceable connection in which the composite elements are movable parallel to their surface can allow a displacement perpendicular and parallel to the connecting edge to an adjacent composite element, and preferably a displacement only parallel to the connecting edge to an adjacent composite element. The connecting edge to the adjacent composite element is here that side of the composite element which runs parallel to the length of the composite element. In general, the connecting edges are of profiled configuration, wherein the connecting edges of adjacent composite elements interlock in the manner of a tongue and groove system. In this case, the fastening of a composite element is respectively realized on one side by the tongue and groove connection. This allows an only one-sided fastening to the supporting structure along a longitudinal edge, in which the fastening regions lie in a line. The fastening to the supporting structure is here usually effected on the side of the tongue. Only in the case of the first composite element, which cannot reach with its groove over the tongue of an adjacent composite element, is a fastening to the supporting structure on the side of the groove also absolutely necessary.

The displaceable fastening can be realized by all possible fastening variants which are known to the person skilled in the art and which enable a displacement. Thus the displaceable fastening can be selected, for example, from a clamp, a displaceable locking bar, a linear bearing, a rail guide, a screw connection with a screw through distance pieces which enable a movement of the screw, a screw connection with screws having a flexible core, or a screw connection through a long hole, a fastening with springs, which are fastened on the one hand to the composite element and on the other hand to the supporting structure, or a fastening with a flexible intermediate element.

A clamp here comprises, for example, two interlocking flat hooks, wherein one flat hook is fastened to the supporting structure and the second flat hook is fastened to the composite element. The interlocking flat hooks are here not fixed to each other, so that they can shift relative to each other.

In contrast to a clamp which allows a movement perpendicular and parallel to the longitudinal edge of the composite element, in the case of a displaceable locking bar only a displacement in one direction is possible. Such a locking bar here comprises a fixed element, which is displaceably accommodated in an eyelet. For the fastening of the composite element to the supporting structure, it is here both possible to attach the fixed element to the composite element and the eyelet to the supporting structure and to attach the fixed element to the supporting structure and the eyelet to the composite element.

If a linear bearing is used as the displaceable fastening, then any linear bearing which is known to the person skilled in the art can be used. In this case, it is particularly preferred if the linear bearing enables a displacement only in one direction. In order to enable a displacement of the composite element in relation to the supporting structure, the linear bearing is attached, for example, with the fixed part to the composite element and with the movable part to the supporting structure. Alternatively, a fastening of the fixed part to the supporting structure and of the movable part to the composite element is also, of course, possible. Linear bearings which can be used for the fastening can be, for example, linear motion bearings such as linear roller bearings or linear ball bearings, or perhaps linear slide bearings. In this case, any structural form of linear bearings which is known to the person skilled in the art and with which linear bearings a fastening of the composite element to the supporting structure can be realized, is usable.

A further option of a displaceable fastening is the use of a rail guide. To this end, a rail can in general be attached either to the supporting structure or to the composite element, and a component displaceable on the rail can be attached to the respectively other element. The component displaceable on the rail can be, for example, at least one roller or a second rail which is slidingly displaceable on the rail. In order to ensure a fastening of the composite element to the supporting structure, it is here possible, for example, to design the rail such that it encloses the rollers in order to prevent the composite element from possibly tilting away from the supporting structure. Alternatively, it is also possible to design the rail and the rollers such that the rollers reach behind the rail and a fastening is in this way realized. If the rail guide comprises two rails sliding one against the other, it is advantageous if the rails enclose each other such that a stable fastening which only allows displacement in one direction is likewise obtained. In order, where two rails are used, to facilitate the relative movement of the rails one to the other, it is further possible additionally to position rollers between the rails, so that the rails do not slide directly one upon the other, but run respectively on the rollers. For the fastening of the composite element to the supporting structure, any rail guide which is known to the person skilled in the art and which can bear that weight of the composite component which acts on the fastening is here suitable.

Apart from the fastening with linearly movable elements, it is also possible to realize the displaceable fastening by a suitable screw connection or a suitable material selection.

In order to obtain a displaceable fastening with a screw connection, it is possible, for example, to guide the screw connection through distance pieces positioned between the composite element and the supporting structure. The screws which are used are here flexible, so that they can deform within the distance pieces, thereby enabling movement of the composite element. The flexibility of the screws can be achieved by a suitable choice of material and a suitable diameter. Brittle materials which lead to a fracture if the screw gets bent are not suitable here.

Furthermore, care should be taken to ensure that that the material is selected such that also regular bending and bending back of the screw does not lead to a fracture. Ductile materials such as steel, aluminum, copper, in particular carbon steel and stainless steel or special steel, are therefore particularly suitable. In order to be able to ensure a sufficient displacement of the composite element, it is further necessary that the screws which are used permit a sufficiently large elastic or plastic, preferably elastic deformation. A flexible screw of this kind, or perhaps a screw having a flexible core, can alternatively also be used without the use of distance pieces. In this case, the deformation of the screw takes place within the core of polymer material in the composite element. In order not to damage the core of polymer foam, the use of distance pieces is in this case, however, preferred.

Alternatively to the use of distance pieces, it is also possible to guide the screw through a long hole, so that, by displacement of the screw in the long hole, a movement of the composite element on the supporting structure is at the same time enabled. To this end, it is on the one hand possible to guide the screws respectively through a fitting hole in the composite element and to provide the long hole on the supporting structure. The screw is then guided through the long hole and, on the side lying opposite the composite element, fixed with a nut. In this case, the nut is tightened only to the point where the composite element remains in place, yet a displacement of the screw within the long hole continues to be possible. The long hole can here be configured either in a beam of the supporting structure or in a fastening element connected to the beam, for example an angle bracket fitted on the beam. The angle bracket can here, for example, be screwed, riveted, bonded or welded to the beam. In order, in particular, to enable a displacement of the composite element parallel to the longitudinal edge, the long hole is configured such that it is oriented parallel to the longitudinal edge of the composite element.

Alternatively to the configuration of the long hole on the supporting structure, it is also possible to make the long hole in the composite element. Preferably, the long hole is formed, however, on the supporting structure.

For an easier assembly, it is also possible to guide the screw not through a long hole, but through a hole of such diameter that a movement of the screw within the hole is possible. To this end, the diameter of the hole is preferably at least twice as large as the diameter of the screw. The maximum diameter of the hole is limited by the screw head or by a washer system of the head, for instance a plain washer. In order to avoid a situation in which the screw passes through the hole, it is necessary for the screw head to have a larger diameter than the hole. If a screw having a non-circular head is used, for example having a hexagon, it is necessary for the maximum extent of the screw head to be such that it cannot pass through the hole. Particularly preferably, the screw head is of such a size that always the full rim of the screw head rests on the material surrounding the hole.

A further option for a fastening which allows displacement of the composite element in relation to the supporting structure is the use of springs attached on the one hand to the composite element and on the other hand to the supporting structure. In this case, any chosen springs which are known to the person skilled in the art can be used. It is thus possible, for example, to use leaf springs or helical springs. In the use of springs, care should be taken to ensure, however, that the resilient mounting is designed such that the composite elements do not start to vibrate when a compressive force is applied to them. To this end, the spring constant must be rated appropriately. Furthermore, it is sufficient to use a spring having a spring travel within the range from −20 mm to 20 mm, preferably within the range from −14 mm to 14 mm.

A further option is the use of a flexible intermediate element. A flexible intermediate element of this kind can be, for example, an angle bracket made of an elastically deformable material which has sufficient strength, however, to hold the composite element. Suitable materials are, for example, steel, aluminum, copper, wood and plastics. Suitable plastics are, for example, polyamides (PA), polybutylene terephthalate (PBT), polyethylene terephthalate (PET), polycarbonate (PC), styrene-acrylonitrile copolymers (SAN), polyurethane (PU), polyethylene (PE), polypropylene (PP), polyvinyl chloride (PVC), acrylonitrile-butadiene-styrene copolymers (ABS), acrylonitrile-styrene-acrylate (ASA), thermoplastic polyurethane (TPU), thermoplastic elastomers (TPE), resins, for instance epoxy resins, phenolic resins or polyester resins, rubbers, for instance natural rubber (NR), nitrile-butadiene rubber (NBR), styrene-butadiene rubber (SBR), chloroprene rubber (CR), butadiene rubber (BR) and ethylene-propylene-diene rubber (EPDM).

For the fastening of the composite element, it is possible to provide only one fastening element in each fastening region. Alternatively, more than one fastening element can also however be provided. In addition, it is possible to provide at least one fastening element both in only one fastening region and in more than one fastening region, for instance in all. It is here preferred to use the same type of fastening element in all fastening regions in which the composite element is displaceably fastened. Furthermore, in all fastening regions in which the composite element is displaceably fastened an equal number of fastening elements is preferably used. The number of fastening elements in the fastening region in which the composite element is immovably connected to the supporting structure can here differ from the number of fastening elements in the fastening regions in which the composite element is displaceably fastened. Thus, depending on the type of fastening elements in the regions in which the composite element is displaceably fastened, it is possible, for example, to provide respectively only one fastening element in the regions in which the composite element is displaceably fastened and to use a plurality of fastening elements, for instance screws, in the fastening region in which the composite element is immovably fastened to the supporting structure.

The outer metallic layer of the composite element can have any color. Since, however, the formation of waves occur in particular in dark facade areas, that is to say a dark outer metallic layer, it is particularly preferred to use the facade according to the invention in connection with rather dark outer faces. In this case, a division is made into three color groups. Color group one is in general very bright surfaces having a reflectance value of more than 75%, color group two in general bright surfaces having a reflectance value of 40% to 74%, and color group 3 in general dark surfaces having a reflectance value of less than 39%, respectively related to a near-earth solar spectrum. It is here preferred if the outer metallic layer has a color having a reflectance value within the range from 0 to 74%, particularly preferably from 0 to 39%. The reflectance value is constituted by the percentage share of reflectance including gloss in the visible and near-infrared zone of the near-earth solar spectrum between 300 nm and 2500 nm wavelength. A reflectance value of 0% signifies black.

For the determination of the reflectance, a suitable reference spectrum, corresponding to the near-earth solar spectrum, is specified in ASTM G 173-03, 2008, in Table 2. For the measurement of absorption, transmission and reflectance, the equipment set-up described in ASTM E903-96, April 1996, the so-called integration sphere, can be used. The analytical evaluation then takes place, as set out in ASTM E903-96, April 1996.

The composite elements can be fastened to the supporting structure at any angle. A horizontal or vertical fastening is customary. In this case, the orientation along the longitudinal edge of the composite element is defined. In the case of a horizontal fastening, the longitudinal edges of the composite elements run horizontally, and correspondingly, in the case of a vertical fastening, vertically.

BRIEF DESCRIPTION OF THE DRAWINGS

Illustrative embodiments of the invention are represented in the figures and are explained in greater detail in the following description, wherein.

DETAILED DESCRIPTION OF THE DRAWINGS

Figure 1:
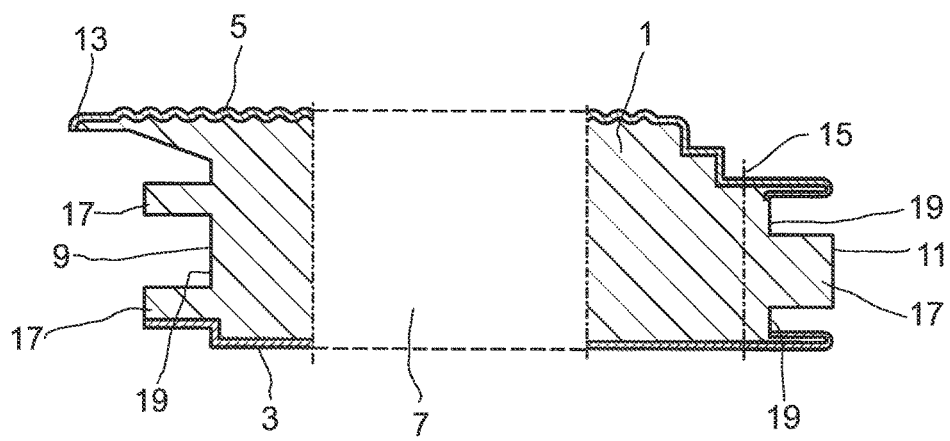
FIG. 1 shows a cross section through a composite element.

FIG. 1 shows a cross section through a composite element as is used for facades, in particular of commercial properties such as warehouses or industrial buildings, for instance workshops or assembly shops, sports halls or department stores.

A composite element 1 is made up of an inner cover layer 3, an outer metallic cover layer 5, and a core 7 of a polymer foam. The inner cover layer 3 can be produced from a metal, a plastic, wood, or perhaps of roofing board. Preferably, the inner cover layer 3 is made of a metal, however. Furthermore, it is particularly preferred to use for the inner cover layer 3 and for the outer metallic cover layer 5 respectively the same material. Suitable metals are, for example, steel, special steel, aluminum or copper.

Along the longitudinal direction of the composite element, structures 9, 11 are configured on both sides, wherein the structure 9 on one side is broadly the negative image of the structure 11 on the opposite side, so that, when the composite elements are mounted, the structures 9, 11 interlock in accordance with a tongue and groove joint. For the assembly, the composite elements 1 are respectively connected on one side to a supporting structure (not represented here). On the side on which the composite element is not connected to the supporting structure is formed an overhang 13, which, following assembly of the composite elements 1, protrudes over the fastening elements 15, for instance screws, with which the adjacent composite element 1 is fastened to the supporting structure, and thus covers the fastening elements 15. In this way, a facade on which no fastening elements are visible is produced. The hold of the composite element 1 on the side on which no fastening means are provided is effected by the sliding of the structures 9, 11 one into the other. The shape of the structures 9, 11 acting as a tongue and groove joint here usually has, as represented here, a plurality of projections 17 and recesses 19. The structures 9, 11 can here have any shape known to the person skilled in the art.

Figure 2A:
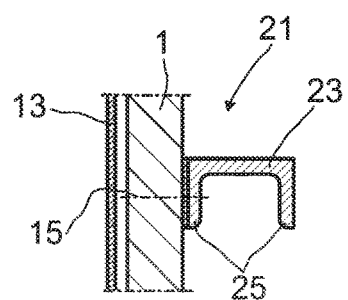
FIGS. 2a to 2c show a longitudinal section through a facade detail with different supporting structures.
Figure 2B:
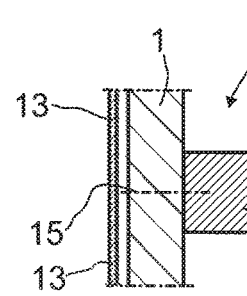
Figure 2C:
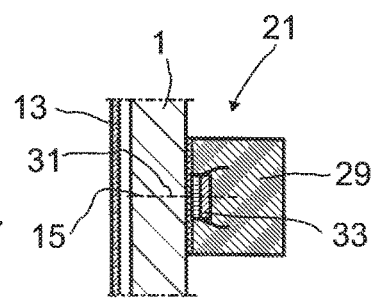

In FIGS. 2a, 2b and 2c, fastenings of composite elements to different supporting structures are respectively represented schematically.

In the variant represented in FIG. 2a, the supporting structure 21 is made up of steel U-profiles 23. The individual composite elements 1 are here attached to the respective U-profiles 23 of the supporting structure 21. The U-profiles are here preferably oriented such that the legs 25 of the U-profiles run transversely to the longitudinal direction of the composite elements 1. Thus the legs 25 of the U-profiles 23, for example given a vertical assembly of the composite elements 1, can point upward or, as represented here, downward.

Alternatively to the variant represented in FIG. 2a, comprising metal, in particular steel beams, it is also possible to construct the supporting structure 21 from wooden or concrete beams. In the case of wooden beams 27, as represented in FIG. 2b, those of the kind which have a rectangular, preferably square cross section are preferably used. For a screwing of the composite elements 1, it is here possible to use wood screws which are screwed directly into the wooden beams. In the case of concrete beams 29, as represented in FIG. 2c, correspondingly suitable fastening means, which enable fastening in concrete, are used. To this end, it is possible, for example, to predrill and to use dowels, or to cast a thread 31 into the concrete beam 29, to run this thread 31 through the composite element 1, and to fasten with a nut 33 on the side facing away from the concrete beam 29. Alternatively, a suitable nut could also be cast into a notch in the concrete beam, and the composite element can then be fastened with a suitable screw which engages in the nut cast into the concrete beam. Further fastening methods are possible.

In all three represented variants of supporting structures, the fastening elements 15 with which the composite elements 1 are fastened to the supporting structure 21 are covered by the overhang 13 of an adjacent composite element.

Figure 3:
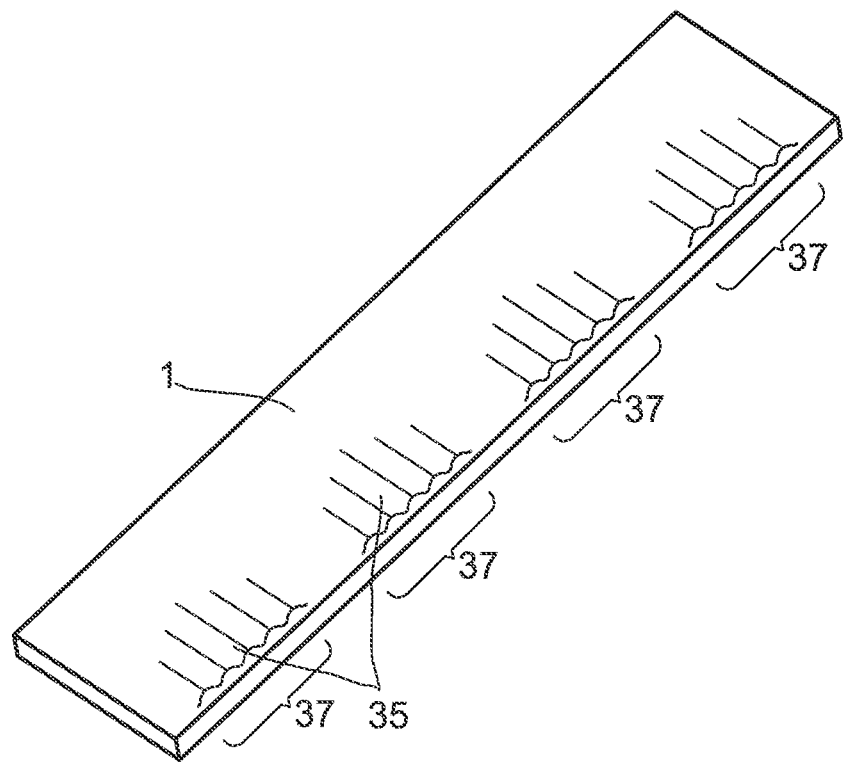
FIG. 3 shows a three-dimensional view of a facade element with wavy damage pattern.

FIG. 3 shows a three-dimensional view of a facade element having a wavy damage pattern.

A wavy damage pattern 35 can arise in particular in the region of the respective fastening regions 37 of the composite element 1. Such a damage pattern can be observed in particular when the composite elements 1 have been mounted at low temperatures and the sun subsequently shines onto the composite elements.

In order to avoid such a damage pattern, the composite elements 1 are connected according to the invention in one fastening region 37 fixedly to the supporting structure 21 and in the remaining fastening regions 37 displaceably, or alternatively in all fastening regions 37 displaceably, wherein the composite elements 1 in this case rest firmly on a mounting. Suitable fastening elements, which enable a displaceable fastening of the composite elements to the supporting structure 21, are represented in FIGS. 4 to 7.

Figure 4:
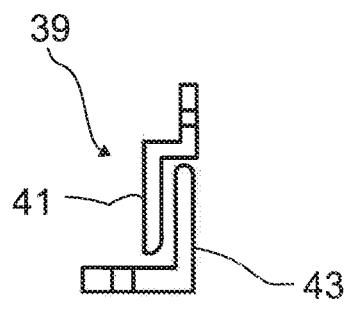
FIGS. 4 to 7 show different variants of fastening elements for a displaceable fastening of the composite elements.

One option for a displaceable fastening is a clamp as represented in FIG. 4.

A clamp 39 here comprises a first flat hook 41, which is fastened to the supporting structure, and a second flat hook 43, which is attached to the composite element. The first flat hook 41 and the second flat hook 43 here interlock such that they are displaceable one into the other. In this case, a two-dimensional displacement in the longitudinal direction and in the transverse direction is possible. A movement in the direction of the supporting structure is barred. In order to ensure that the flat hooks 41, 43 do not shift so far that they no longer interlock, the flat hooks 41, 43 shall be dimensioned such that contact still exists even in the event of a maximum displacement.

Figure 5:
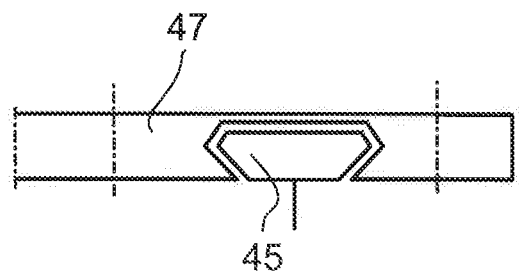

A second option for a displaceable fastening is represented in FIG. 5. In the case of this displaceable fastening, a rail 45 is guided in a guide 47. This type of fastening here allows only a one-dimensional displacement. The rail 45 and the guide 47 are therefore fitted such that a displacement in the longitudinal direction of the composite element is enabled. To this end, the rail 45 is attached either to the composite element, or alternatively to the supporting structure, parallel to the longitudinal direction of the composite element. Correspondingly, the guide 47 is fastened to the supporting structure if the rail 45 is mounted on the composite element, and to the composite element if the rail 45 is mounted on the supporting structure.

The fastening of the guide 47 is effected, for example, with the aid of screws which are respectively positioned next to the rail 45. The rail 45 Can also be fastened by a screw connection. Alternatively, a fastening of the rail 45 and of the guide 47 by bonding, welding or riveting is also conceivable.

In order to obtain a trouble-free displacement, the guide 47 has a profile corresponding to the cross-sectional area of the rail 45. The cross-sectional area of the guide 47 is here somewhat larger than that of the profile of the rail 45 in order to prevent tilting or jamming. The length of the guide 47 is likewise chosen such that a tilt-free displacement of the rail 45 in the guide 47 can be ensured. The length of the rail 45 is chosen such that it does not slide out of the guide 47 even in the event of maximum displacement.

Figure 6:
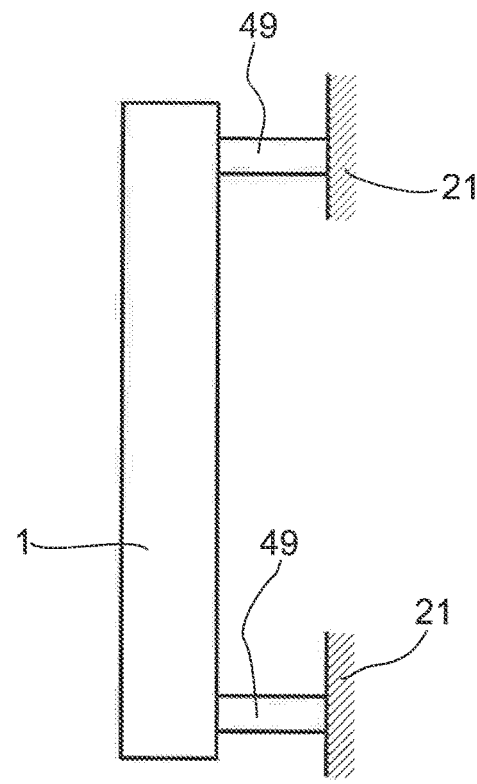

FIG. 6 shows schematically a fastening of the composite element to the supporting structure with the aid of springs. To this end, springs 49 are attached with one side to the composite element 1 and with the other side to the supporting structure 21. The springs are here designed such that they have a maximum spring travel from −20 to 20 mm. The springs are further designed such that the composite elements do not start to vibrate when a force is applied.

Alternatively to the springs 49, it is also possible to use distance pieces made of a flexible material, so that a movement of the composite element is enabled by the distance pieces. Upon the movement of the composite element, the distance pieces are preferably elastically deformed, so that they are not damaged by repeated load due to changing movement of the composite element.

Figure 7:
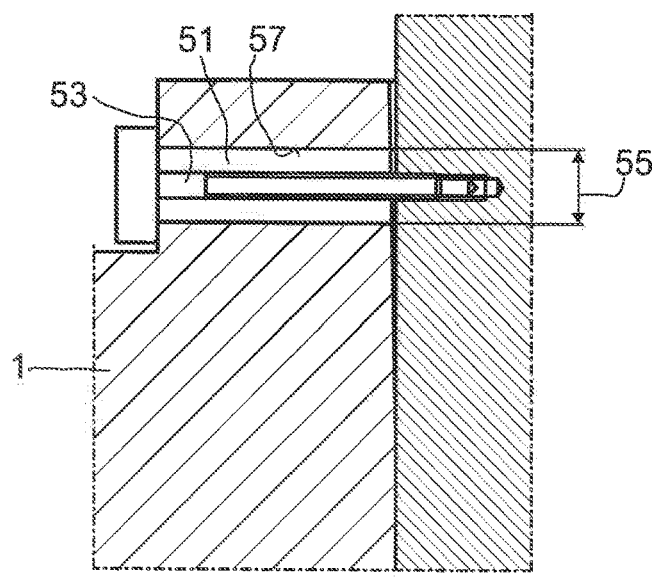

A displaceable fastening with a screw connection is shown in FIG. 7. In order to obtain a displaceable fastening with a screw connection, it is possible, for example, as represented here, to form in the composite element 1 a hole 51 which has a larger diameter than the screw 53. The diameter 55 of the hole 51 is here chosen such that a sufficient movement of the screw is possible. An additional security can be obtained by virtue of a flexible screw. In this case, a further displacement of the composite element can still be ensured even when the screw is already butting against the rim 57 of the hole 51, by deformation of the screw. In general, a sufficient movement is achieved if the hole 51 has a diameter which is 2 to 3 times as large as the diameter of the screw. In order to obtain a secure fastening of the composite element 1 and to prevent the screw from sliding through the hole, a screw 53, the screw head of which has a diameter which is larger than the diameter of the hole 51, is used.

Alternatively to the large hole 51 which is represented here, it is also possible to provide in the composite element 1 a long hole, through which the screw is guided. A long hole here has the further advantage that a movement is possible only in one direction. In this case, the long hole is oriented such that it runs parallel to the longitudinal direction, that is to say parallel to the structures 9, 11 of the composite element 1.

REFERENCE SYMBOL LIST

1 composite element
3 inner cover layer
5 outer metallic cover layer
7 core
9 structure
11 structure
13 overhang
15 fastening element
17 projection
19 recess
21 supporting structure
23 U-profile
25 leg
27 wooden beam
29 concrete beam
31 thread
33 nut
35 wavy damage pattern
37 fastening region
39 clamp
41 first flat hook
43 second flat hook
45 rail
47 guide
49 spring
51 hole
53 screw
55 diameter of the hole 51
57 rim

The invention claimed is:

1. A facade for a building comprising:
composite elements, the composite elements respectively having an inner cover layer, a polymer foam layer as a core, and an outer metallic cover layer, and being fastened to a supporting structure,
wherein each composite element has at least two fastening regions that lie on a line parallel to the longitudinal direction of the composite element,
wherein
(i) in one fastening region, the composite elements are immovably connected to the supporting structure, and in all other fastening regions, the composite elements are displaceably connected to the supporting structure, or
(ii) the composite elements rest with the ground-facing side on a mounting, and are displaceably connected to the supporting structure in all fastening regions.

2. The facade as claimed in claim 1, wherein a displaceable connection of the composite elements to the supporting structure enables-displacement of the composite elements only parallel to a connecting edge at which an adjacent composite element is attached.

3. The facade as claimed in claim 1, wherein a fastening of the displaceably connected fastening region is selected from the group consisting of a clamp, a displaceable locking bar, a linear bearing, a rail guide, a screw connection with a screw through distance pieces which enable a movement of the screw, a screw connection with screws having a flexible core, a screw connection through a long hole, a screw connection through a hole of a diameter that enables a movement of the screw within the hole, a fastening with springs that are fastened to the composite element on one side of the springs and are fastened to the supporting structure one an opposite side of the springs, and a fastening with a flexible intermediate element.

4. The facade as claimed in claim 1, wherein, in at least one fastening region, at least two fastening elements configured to fasten the composite element to the supporting structure are provided.

5. The facade as claimed in claim 1, wherein a connection of the fastening region of immovable connection is one of a screw connection, riveting, bonding, and welding.

6. The facade as claimed in claim 1, wherein each composite element has at least three fastening regions lying in a line.

7. The facade as claimed in claim 1, wherein the fastening regions on each composite element are positioned such that, following assembly, the fastening regions are respectively concealed by an adjacent composite element.

8. The facade as claimed in claim 1, wherein the outer metallic cover layer has a color having a reflectance value within the range from 0 to 74% based on a near-earth solar spectrum.

9. The facade as claimed in claim 1, wherein the composite elements are fitted one of vertically and horizontally to the supporting structure.

10. The facade as claimed in claim 1, wherein the composite elements have a length within the range from 2.5 to 30 m.

11. The facade as claimed in claim 1, wherein the composite elements have a width within the range from 0.5 to 1.25 m.

12. The facade as claimed in claim 1, wherein the composite elements have a thickness within the range from 60 to 140 mm.

13. The facade as claimed in claim 1, wherein the outer metallic cover layer has a thickness within the range from 0.25 to 1.5 mm.

14. The facade as claimed in claim 1, wherein the outer metallic cover layer is one of a plane and a layer with microprofilation.

15. The facade as claimed in claim 1, wherein the facade is a facade of one of a warehouse, a workshop, a sports hall, a department store, and an assembly shop.

16. The facade as claimed in claim 9, wherein a horizontal fitting of the supporting structure is formed by the underlying composite element.

* * * * *